C. B. WINDER.
SHOOTING GALLERY TARGET.
APPLICATION FILED JAN. 25, 1907.

905,397.

Patented Dec. 1, 1908.
2 SHEETS—SHEET 1.

WITNESSES:

INVENTOR.
Charles B. Winder
BY
ATTORNEY.

C. B. WINDER.
SHOOTING GALLERY TARGET.
APPLICATION FILED JAN. 25, 1907.
905,397.
Patented Dec. 1, 1908.
2 SHEETS—SHEET 2.
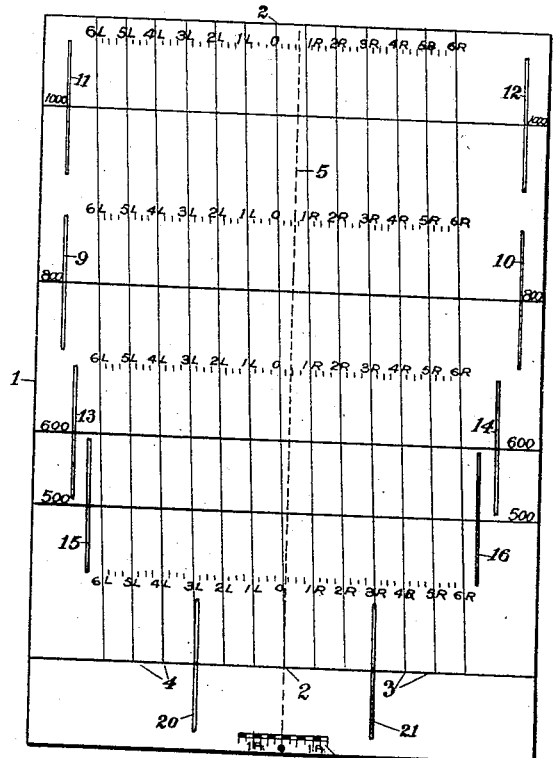
Fig. 2
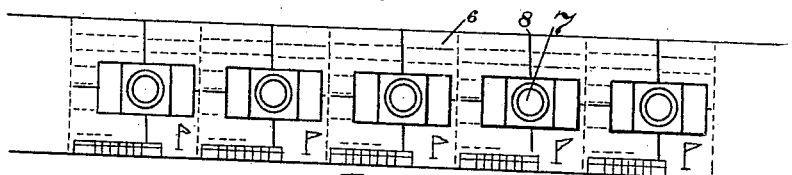
Fig. 3
Fig. 5
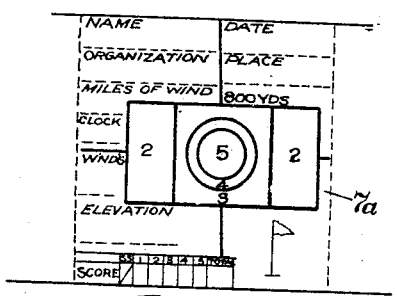
Fig. 4
WITNESSES:
Charles B. Winder INVENTOR.
BY
ATTORNEY.

UNITED STATES PATENT OFFICE.

CHARLES B. WINDER, OF COLUMBUS, OHIO.

SHOOTING-GALLERY TARGET.

No. 905,397.  Specification of Letters Patent.  Patented Dec. 1, 1908.

Application filed January 25, 1907. Serial No. 354,139.

*To all whom it may concern:*

Be it known that I, CHARLES B. WINDER, a citizen of the United States, residing at Columbus, in the county of Franklin and State of Ohio, have invented certain new and useful Improvements in Shooting-Gallery Targets, of which the following is a specification.

My invention relates to improvements in armory targets and comprises means for reproducing the conditions under which range firing is done.

It consists essentially in a chart which represents indoors the windage conditions out of doors and is constructed to represent the various distances over which firing will take place, more usually spoken of as the elevation; this chart is preferably provided with means for securing thereto an aiming target and also a record target, the latter being adjusted according to the assumed windage and elevation.

It further provides means for disclosing to the marksman the assumed velocity and direction of the wind.

It further comprises what may be called a skirmish target, in which the figures are diminished in proportion to the distance, or as expressed in the usual term, elevation.

Figure 1:
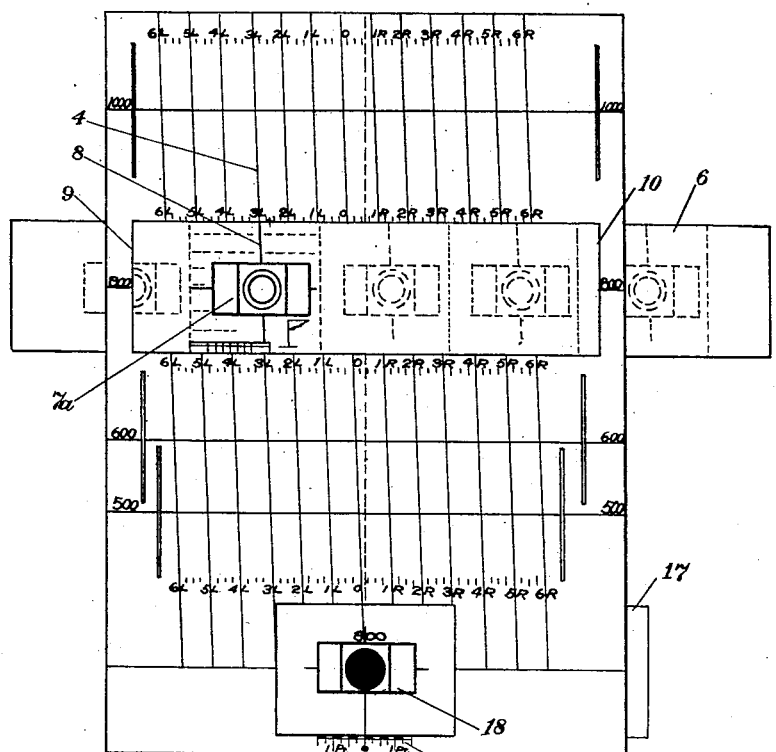
Figure 7:
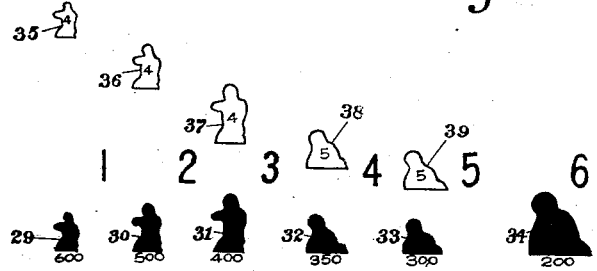
Figure 8:
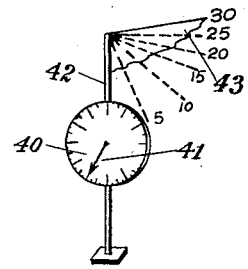
Figure 6:
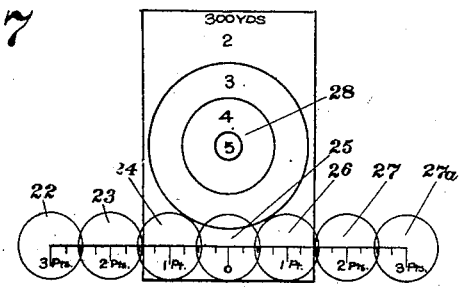

With these and other objects in view, which will be more particularly hereinafter described and embodied in the claims, the following drawings, illustrating one embodiment of my invention, are hereto attached and hereby made a part of this specification, to wit:

Figure 1 shows a windage and elevation chart with a record and an aiming target in place; Fig. 2 represents the windage and elevation chart; Fig. 3 shows a strip of record targets; Fig. 4 represents a single record target, enlarged to show the items of the record to be kept by the marksman; Fig. 5 represents a strip of aiming targets, diminished from the regulation size in proportion to the elevation; Fig. 6 represents the aiming and record targets on a single sheet, the elevation assumed being three hundred yards; Fig. 7, represents the skirmish target; Fig. 8 shows the clock and flag used for indicating direction and velocity of wind.

The object of my invention is to reproduce as nearly as possible the conditions prevailing in range firing, and this embodiment thereof shows targets and windage and elevation charts adapted to a firing distance of fifty feet, inasmuch as that is the space usually provided for shooting practice in galleries and armories; therefore the targets are reduced in size in proportion to the reduction of the distance indicated.

In range shooting the target includes the aiming bull's-eye and designated spaces adjacent thereto, a shot taking effect in one space being scored as of a certain value, and in another space of another value, and so on, each space designated having ascribed thereto a particular value, the score of the marksman being made up of the sum of the values, and the relative accuracy of the score being the ratio existing between the total of the values made and the total possible to be made. The marksman is not left to his own imagination as to distance, but this is stated before firing is commenced; nor is he left to his own resource to determine the windage, but the latter is calculated by means of a table furnished him, in connection with the clock and flag. The angle made by the latter with the flag staff is determined by the velocity of the wind, and after a little practice the marksman becomes able to judge of its velocity upon noting the angle, it being apparent that the greater the angle the greater the velocity. A vane used in connection with the flag will indicate the direction of the wind, the direction being of the greatest importance when either right or left, that is, across the path of travel of the bullet. In shooting practice it is assumed that the marksman faces the dial of a clock having the twelve hour points noted thereon, and a wind blowing from the right of the vertical line connecting the twelve hour point and the six hour point is described as a right wind, and a wind blowing from the opposite side of this vertical line is described as a left wind; in range work the vane will indicate the direction of the wind as being right or left and if the wind is blowing directly from the right it will be designated as a three o'clock wind, and if from a point above or below three o'clock it will be designated as a one, two, four or five o'clock wind. The same method is used in respect to wind blowing from the left, it being understood that a wind from the left striking the assumed vertical line connecting the twelve hour and the six hour points perpendicularly will be designated as a nine o'clock wind, the other points being designated as seven, eight, ten, eleven o'clock respectively. A six o'clock wind will be one accordingly blowing directly away from the marksman, while a twelve o'clock wind will be one blowing towards him, and in both of these cases no allowance for lateral deflection for windage is to be made, the allowance in such case being one for elevation only.

The direction and velocity of the wind being thus indicated, the marksman consults the windage and elevation table and finds, by way of illustration, that a three o'clock wind, blowing fifteen miles an hour will require the rear of the sight to be shifted two points to the right if the elevation is three hundred yards, two and two-thirds points if six hundred yards, four and one-half points if one thousand yards, and so on, the number of points being easily ascertained from the wind allowance table; the latter being no part of this invention, and therefore need not be further described.

The military rifle is provided with a scale indicating points of windage, and the rear of the sight in the case assumed will be moved the indicated number of points to the right, the sight will then be adjusted vertically for elevation, and the marksman will aim at the target; however the direction given to the bullet will be to the right of the target, but if allowances for wind and distance have been properly made the shot will strike the target, being swept towards the left by the wind. After some experience on the range the marksman will be able to estimate with much accuracy the velocity of the wind as indicated by the angle between the flag and the flag staff, his judgment being based upon the sensation of feeling and the swaying of natural objects. The elevation, also, can be determined with much accuracy after experience in observing the size of a human being or the target at varying known distances.

Hitherto, it is believed, no device has been provided for the purpose of reproducing range conditions in gallery and armory practice; it is apparent that if a system be followed which reproduces range conditions, it will be of great benefit to the marksmen and will prepare them to grasp and adjust themselves at once to the conditions of range shooting, which in turn is a preparatory course for actual military work. This object I have kept constantly in mind and have devised a system which is embodied in a preferable form in the drawings, and which will now be described in detail.

Referring to the drawings, in which the same numerals indicate identical parts throughout, 1 is the windage and elevation chart containing the central inclined line 2 and the vertical lines 3 at the right thereof and 4 at the left thereof; 5 indicates the plumb line and it will be seen that the lines 3 and 4 are drawn at an angle with said plumb line. This divergence of the lines from the plumb line is made to provide allowance for the variation found in almost all rifles, it being a matter of experience that the bullet will carry a little out of the true line. The inclined lines 3 at the right of the central line 2 are marked $1^R$, $2^R$, $3^R$ and so forth, meaning one point of wind to the right, two points of wind to the right, and so forth; the lines at the left are marked to indicate the points of wind from the left, or as usually expressed, left wind. The number of lines is sufficient to make provision for all conditions of windage which would likely be experienced in range shooting.

The record target strip 6 is provided with a plurality of targets 7 each target being provided with a list of items which, when filled out, constitute the record of the marksman for the target in question. A complete record is provided, showing the name of the marksman, the date, the organization of which he is a member, the place where the record was made, the miles of wind, the clock (or direction), the windage, the elevation, the position of the flag, and the detail score and total. These items may all be seen in Fig. 4. The plurality of targets is provided on each strip so that a number of records may be had in a permanently connected form, for the same elevation, it being noted that each record target strip is made for one distance only. The line 8 extending from the upper side of the target to the top of the strip, is a continuation of the vertical diameter of the inner circle, and if the target be moved to the right or to the left of the central vertical line 2, the line 8 should register with the desired windage line. The sheet 1 is provided at intervals with slit openings, arranged in pairs 9 and 10, through which the record target strip may be inserted at each of its ends and thereby held in place; the strip may be moved laterally to bring any desired target in register with any desired windage line. The strip shown in place is adapted to be used at an elevation of eight hundred yards, and the details indicated by the said strip and the manner of the usage are the same as for any of the other record target strips for the usual elevations from five hundred yards up, and need not therefore be specifically shown or described. The slit openings for the reception of the remaining target strips are shown in pairs at 11 and 12, 13 and 14, and 15 and 16.

The aiming target strip is shown at 17 and is provided in the form here shown with two aiming targets, 18 and 19, the size being proportionate to the distance at which the target is assumed to be placed. A pair of slit openings 20 and 21 is provided for the reception of the ends of the strip, for holding the same in place. The aiming target 18 is adjusted centrally on the vertical line 2 and the sight is drawn upon the point where this line would pass through the aiming target if said line were extended.

The targets for use at the elevation of three hundred yards are shown in close proximity to the aiming targets on a single card; 22, 23, 24, 25, 26, and 27 and 27ᵃ indicate aiming targets located to show different degrees of windage, right and left, and the record target is designated at 28. Here, as in the case of the windage and elevation chart hereinbefore described, aim is taken at the aiming target desired, but the shot should take effect on the record target if the proper adjustment of the sight has been made for windage and elevation.

In Fig. 7 is shown the skirmish targets, the lower group of figures 29, 30, 31, 32, 33, and 34 representing respectively the aiming targets for the various distances indicated, and the second row of figures 35, 36, 37, 38, and 39 representing the record or scoring targets respectively corresponding to the lower group. It is noted that at the right the aiming and scoring target are identical, and it is further noted that the distance indicated for this target is two hundred yards; at this distance no allowance need be made for deflection of the bullet due to elevation or weather conditions, and the marksman should therefore strike the object aimed at. In range shooting a squad of men are given several marching commands and are brought round to the firing line for the first target on the left which is presumed to be at the maximum distance; the command to fire is then given, the men being acquainted with the elevation, and judging of the direction and velocity of the wind from the flag and vane. After a certain number of shots are fired at this target, further marching commands are given and the men advance and are halted upon the firing line at an indicated distance from the second target on the left, with which distance they are familiar, and further firing commands are given as in the first case. The marching movements are then repeated and an agreed number of shots are taken at the other targets, the squad of marksmen approaching the respective targets to within the indicated distances.

The object of the skirmish targets here shown is to reproduce the range skirmish, and the distances indicated are made known to the marksmen, and the clock and flag indicate the direction and velocity of the wind to be overcome by the adjustment of the sight. In this course of shooting the men familiarize themselves with the adjustments necessary for the range under ordinary conditions, the same firing line however being observed in the case of all of the targets, the elevation being accounted for by the adjustment of the sight, the vertical distance between the aiming and scoring targets representing the deflection upwardly of the bullet due to elevation. The movement of the marksmen on the range in advancing from one firing line to another is intended to be imitated in gallery work by marching the men in a circle bringing them back each time to the same firing line, the object of the drill being to accustom the men to firing rapidly and immediately after halting.

In Fig. 8 are shown the clock and flag; the dial 40 has the hand 41 mounted radially thereon in the usual manner, and the hand is adapted to be turned to indicate the direction from which it is assumed that the wind is blowing; if the hand indicates a point to the right of the central vertical line the wind will be called a right wind, and will be designated further as a three o'clock wind, four o'clock wind and so forth. If the hand indicates a point on the left of the central vertical line passing through the dial, the wind is assumed to be coming from that direction and will be called a left wind, and will further be designated as a nine o'clock wind, a ten o'clock wind, and so forth. The flag provided for indoor work in connection with my targets has a staff 42 and the flag 43; the latter may be set at the angle to indicate any desired velocity of wind, the approximate angle for the different velocities indicated being shown in the drawings; the smallest angle indicates the lift of the flag by wind blowing five miles an hour; and in succession the angles made by the flag under a wind blowing ten miles an hour, fifteen miles an hour, and so forth, are shown. It is understood that the flag used in gallery work will have preferably a triangular form, the upper edge of the flag being secured to a strip of rigid material and being adjustable upwardly and downwardly, and pivoted at the top of the staff. To indicate a wind of ten miles an hour the upper side of the triangular flag is placed in proper position and the set screw will hold the same in place; if a greater or smaller velocity is intended to be indicated a readjustment may be made at the proper angle and the set screw will maintain the same in the desired position.

Each marksman is furnished with a table in which is shown the points of windage to which the sight must be adjusted in order to accommodate the shooting to various elevations in various velocities of wind coming from the various directions; the charts and target strips embodying my invention are all arranged for use with the said tables and are based on a range of fifty feet, the varying elevations on the range in actual practice being accounted for by the vertical distance between the aiming target and the record target, which is set at the point indicating the assumed elevation.

It will be noted that the record targets provided for herein are not solid black at the center but are open rings; if they were solid the marksman might hold directly on the record target, but by making this target an open ring or a series of open rings, it is not clearly visible to the marksman. This provision obviates the necessity of a strip or patch to cover the record target.

Referring to Fig. 2, it will be noted that provision is made beneath the aiming target for allowing for variation in the sight; it may happen that the sight is not true, or, as it is usually expressed, is off zero; it may be that the variation is either to the right or to the left, but a little experiment will show which. When it is ascertained, the center line of the aiming target my be adjusted so as to register with the proper one of the series of spaces indicated generally at 44. This arrangement adjusts the aiming target properly in relation to the variation in the sight. It is thus seen that provision is made for the variation which may be encountered either in the inherent construction of the rifle, or the sight. Let it be assumed that the target is at an elevation of eight hundred yards, and a left wind of thirty miles an hour is blowing from the direction indicated by the hand of the clock when pointing to either seven or eleven; by reference to my wind allowance table, it will be seen that under these conditions a windage allowance of three points must be made, and I therefore have shown the record target 7ª in Fig. 1 located with its vertical median line registering with the line 4 indicated at the top thereof as 3L. The rear end of the sight will be swung to the left three points as shown upon the scale thereon, and the marksman will hold upon the aiming target indicated at 18, it being assumed in the present case that the vertical median line on said target will register with the zero line indicated at 2. The sight is adjusted vertically to show approximately eight hundred yards of elevation; now if the marksman hold upon the aiming target, the ball should strike approximately in the center of the record target 7ª. This single illustration will show the manner of using my improved target, whereby the marksman becomes accustomed to making allowances and adjustment for conditions which prevail in range shooting. The record target strips for the other elevations shown, namely ten hundred yards, six hundred yards, and five hundred yards, are constructed in a manner similar to the one for eight hundred yards shown in Fig. 1, it being understood that the record targets thereon will have a diameter dependent upon the distance at which the target is assumed to be located.

In practice the operation of my improved target has been successful; the arrangement of the record targets on strips, the calculation of the comparative heights of these strips upon the wind and elevation card, the provision of slit openings through which the strip may be inserted at each of its ends whereby a ready lateral adjustment is afforded, is simple and highly efficient.

Having described my invention, what I claim as new and desire to secure by Letters Patent is:

1. A gallery shooting target apparatus adapted to reproduce the conditions of range firing, comprising means for indicating any assumed windage and elevation, a scoring target arranged to indicate where a shot should take effect under the assumed conditions of windage and elevation, and an aiming target.

2. A gallery shooting target apparatus adapted to reproduce the conditions of range firing, comprising means for indicating any assumed windage and elevation, a scoring target adjustably arranged to indicate where a shot should take effect under the assumed conditions of windage and elevation, and an aiming target.

3. A gallery shooting target apparatus adapted to reproduce the conditions of range firing, comprising means for indicating any assumed windage and elevation, a scoring target arranged to indicate where a shot should take effect under the assumed conditions of windage and elevation, and an adjustable aiming target.

4. A gallery shooting target apparatus adapted to reproduce the conditions of range firing, comprising means for indicating any assumed windage and elevation, a scoring target arranged to indicate where a shot should take effect under the assumed conditions of windage and elevation, appropriate spaces provided adjacent said target for the recording of a complete record of the shots intended to take effect on said target, subject items for said record noted in said spaces, and an aiming target.

5. A gallery shooting target apparatus adapted to reproduce the conditions of range firing, comprising a card, lines thereon to indicate windage, lines thereon to indicate elevation, an aiming target, a line on said card to indicate the location of said target, a scoring target, and means for securing said targets upon said card.

6. A gallery shooting target apparatus adapted to reproduce the conditions of range firing, comprising a card adapted to be suspended, lines thereon indicating windage, lines thereon indicating elevation, an aiming target, a line indicating the location of said target on said card, a scoring target adapted to be positioned upon said card with respect to said windage and elevation lines, and means for securing said targets adjustably upon said card.

7. A gallery shooting target apparatus adapted to reproduce the conditions of range firing, comprising a card adapted to be suspended, windage lines thereon, elevation lines thereon, an aiming target strip adjustably mounted upon said card, said strip having a plurality of aiming targets thereon, a scoring target strip adjustably mounted upon said card, said latter strip being provided with a plurality of scoring targets.

8. A gallery shooting target apparatus adapted to reproduce the conditions of range firing, comprising a card adapted to be positioned vertically, windage lines thereon, elevation lines thereon, an aiming target strip adjustably mounted upon said card, a scoring target strip adjustably mounted upon said card, the target thereon adapted to register with an assumed elevation line and an assumed windage line, and means for indicating any assumed velocity and direction of the wind.

9. A gallery shooting target apparatus adapted to reproduce the conditions of range firing, comprising a card having indicated thereon various degrees of elevation and various degrees of allowance for wind, scoring targets adapted to be adjustably secured upon said card in register with any desired windage and elevation lines, an aiming target adapted to be adjustably secured on said card approximately in register with the central vertical line of said card, and means indicating to a marksman the assumed direction and velocity of the wind, whereby if the fire arm be correspondingly adjusted and aimed, the marksman will hold on the aiming target, but the shot will take effect on the scoring target.

10. A gallery shooting target apparatus adapted to reproduce the conditions of range firing comprising means for indicating any assumed direction and velocity of wind, a windage and elevation chart adapted for use in connection with said means, scoring and aiming targets adapted for use with said chart, a second chart adapted to reproduce conditions on short ranges, and a third chart adapted to reproduce the conditions of the skirmish for various distances.

11. A target comprising an object target, a scoring target, means to indicate the velocity and direction of a hypothetical current of air and charts to indicate the proper position of the scoring target relative to the object target, substantially as shown and described.

12. A target comprising an object target, a scoring target, a dial to indicate the direction of a hypothetical current of air, a wind flag for indicating the velocity of the current of air, and charts to indicate the proper position of the scoring target relative to the object target, substantially as shown and described.

13. A target comprising an object target, a scoring target, means to indicate the direction and velocity of a hypothetical current of air, and means to provide for the force and direction of the hypothetical current of air in setting the scoring target relative to the object target, substantially as shown and described.

14. A target comprising an object target, a scoring target, a dial to indicate the direction of a hypothetical current of air, a wind flag for indicating the velocity of the current of air, and means to provide for the force and direction of the hypothetical current of air in setting the scoring target relative to the object target, substantially as shown and described.

In testimony whereof I affix my signature in the presence of two witnesses.

CHARLES B. WINDER.

Witnesses:
   Geo. W. Rightmire,
   Horace S. Kerr.